United States Patent [19]

Takase et al.

[11] Patent Number: 4,668,054
[45] Date of Patent: May 26, 1987

[54] VARI-FOCAL PHOTOGRAPHIC LENS SYSTEM OF LENS GROUP EXCHANGE TYPE

[75] Inventors: Hiroshi Takase, Tokyo; Masaki Imaizumi, Nagano; Toru Fujii, Tokyo, all of Japan

[73] Assignee: Olympus Optical Co., Ltd., Tokyo, Japan

[21] Appl. No.: 723,895

[22] Filed: Apr. 16, 1985

[30] Foreign Application Priority Data

Apr. 20, 1984 [JP] Japan .................... 59-78646

[51] Int. Cl.$^4$ ................ G02B 9/62; G02B 15/02
[52] U.S. Cl. .................................... 350/422
[58] Field of Search .......................... 350/422

[56] References Cited
U.S. PATENT DOCUMENTS 4,466,707 8/1984 Ikemori et al. ............... 350/422

FOREIGN PATENT DOCUMENTS 56-132305 10/1981 Japan .
56-143407 11/1981 Japan .
58-215619 11/1983 Japan .

*Primary Examiner*—John K. Corbin
*Assistant Examiner*—Rebecca D. Gass
*Attorney, Agent, or Firm*—Cushman, Darby & Cushman

[57] ABSTRACT

A vari-focal photographic lens system of lens group exchange type comprising, in the order from the object side, a first lens unit having positive refractive power, a second lens unit having negative refractive power, and a third lens unit having negative refractive power, the vari-focal photographic lens system being arranged to vary the focal length thereof by exchanging the second lens unit for another second lens unit having different lens configuration.

2 Claims, 4 Drawing Figures

VARI-FOCAL PHOTOGRAPHIC LENS SYSTEM OF LENS GROUP EXCHANGE TYPE

BACKGROUND OF THE INVENTION (a) Field of the Invention

The present invention relates to a photographic lens system for popular cameras and, more particularly, to a vari-focal photographic lens system of lens unit exchange type to be used with popular cameras.

(b) Description of the Prior Art

Known vari-focal photographic lens systems of lens group exchange type to be used with popular cameras are disclosed, for example, in Japanese published unexamined patent applications No. 132305/81 and No. 143407/81. Each of the lens systems disclosed in the above-mentioned Japanese published unexamined patent applications comprises three lens groups, i.e., a first lens unit having positive refractive power, a second lens unit having negative refractive power, and a third lens unit having positive refractive power, and is arranged that the lens unit having negative refractive power is exchanged for a different lens unit and, at the same time, the first lens unit having positive refractive power is moved along the optical axis so as to change the focal length of the lens system and, at the same time, to fix the image surface.

In the above-mentioned type of lens systems, a lens unit having positive refractive power is arranged on the image side and, therefore, the power distribution of said lens systems is different from the power distribution of telephoto type lens systems in which a negative lens component is arranged on the image side. This means that the lens composition of said lens systems is disadvantageous for making the overall length of the lens system short.

SUMMARY OF THE INVENTION

It is, therefore, a primary object of the present invention to provide a vari-focal photographic lens system of lens group exchange type which enables to vary the focal length of the lens system as a whole without moving the stop and which has a short overall length.

The vari-focal photogrpahic lens system according to the present invention comprises a first lens unit having positive refractive power, a second lens unit having negative refractive power, and a third lens unit having negative refractive power.

In case of a lens system with the lens composition as described in the above, rays are converged by the first lens unit having positive refractive power and, then, the degree of convergence of rays is somewhat weakened by the second lens unit having negative refractive power. When the absolute value of the focal length of the second lens unit having negative refractive power is larger, the function to weaken the degree of convergence is smaller, and the magnification of the second lens unit is lower. Therefore, when the focal length of the second lens unit is varied, the magnification of the second lens unit varies, and it is possible to vary the focal length of the lens system as a whole. At that time, the position of the image formed by the second lens unit varies in proportion to the focal length of the second lens unit and, consequently, the position of the image formed by the lens system also varies. It is possible to prevent the above-mentioned variation of the image position when the first lens unit is moved along the optical axis so as to vary the object position for the second lens unit (position of the image formed by the first lens unit).

As both of the second and third lens units have negative refractive powers, each of said lens units should comprise at least one negative lens element. Besides, as paraxial rays are converged by the first lens unit, heights of rays which enter the second and third lens units become low and, consequently, spherical aberration to be caused by the second and third lens units is smaller than spherical aberration to be caused by the first lens unit. Moreover, when the second and third lens units are respectively arranged to have shapes which are roughly concentric with the stop, it is possible to make offaxial aberrations also small and, therefore, it is not necessary to use many lens elements for the second and third lens units for the purpose of correction of aberrations.

On the other hand, as for the first lens unit, heights of paraxial rays which enter the first lens unit are high. Besides, the position of the entrance pupil varies because the first lens unit is to be moved in respect to the stop. As a result, spherical aberrations to be caused becomes large, and variation of offaxial aberrations when varying the focal length becomes large. To prevent the above, the number of lens elements constituting the first lens unit should be made large.

As the first lens unit should have positive refractive power, it should comprise at least one positive lens element. Besides, to correct chromatic aberration, a negative lens element is needed. Moreover, to control spherical aberration and offaxial aberrations as described in the above, it is necessary to arrange at least that the first lens unit has a triplet type lens composition in which it comprises two positive lens elements and one negative lens element.

Due to the reasons described so far, the vari-focal photographic lens system of lens unit exchange type according to the present invention is arranged so that the first lens unit having positive refractive power comprises two positive lens components and one negative lens component, the second lens units having negative refractive power comprises at least one negative lens component, and the third lens units having negative refractive power comprises a negative lens component, and that said vari-focal photographic lens system fulfills the conditions (1), (2) and (3) shown below:

$$1.0 < f_W/f_I < 2.0 \tag{1}$$

$$-0.6 < f_W/f_{II} < 0 \tag{2}$$

$$-1.0 < f_W/f_{III} < 0 \tag{3}$$

where, reference symbols $f_I$, $f_{II}$ and $f_{III}$ respectively represent focal lengths of the first, second and third lens units, and reference symbol $f_W$ represents the focal length of the lens system as a whole in the state of short focal length.

If, in the condition (1), the value of $f_W/f_I$ becomes larger than the upper limit thereof, the refractive power of the first lens units becomes too strong, and aberrations caused by the first lens units cannot be corrected by means of the second and third lens units. If the value of $f_W/f_I$ becomes smaller than the lower limit of the condition (1), inclination angles of paraxial rays, which enter the second lens group, become too small and it is impossible to make the overall length of the lens system short.

If, in the condition (2), the value of $f_W/f_{II}$ becomes larger than the upper limit thereof, the magnification of the second lens unit becomes smaller than 1X and, therefore, it is impossible to obtain the desired value of $f_W$ in the state that the condition (1) is fulfilled. If the value of $f_W/f_{II}$ becomes smaller than the lower limit of the condition (2), the refractive power of the second lens unit becomes too strong. As a result, Peztval's sum becomes too small, and this is not preferable for correction of aberrations.

If, in the condition (3), the value of $f_W/f_{III}$ becomes larger than the upper limit thereof, the type of the lens system becomes different from the telephoto type and, consequently, it is impossible to make the lens system compact. If the value of $f_w/f_{III}$ becomes smaller than the lower limit of the condition (3), the negative refractive power of the third lens unit becomes too strong, and pincushion type distortion will be largely caused by offaxial rays of large heights.

As the vari-focal photographic lens system of lens group exchange type according to the present invention is arranged that the first lens unit, the second lens unit and the third lens unit respectively have positive refractive power, negative refractive power and negative refractive power, it is possible to make the power of the lens unit to be exchanged weaker compared with a lens system comprising lens groups respectively having positive refractive power, negative refractive power and positive refractive power. Therefore, it is possible to make the variation of aberrations to be caused when varying the focal length comparatively small.

DETAILED DESCRIPTION OF THE PREFERRED EMBODIMENT

Now, a preferred embodiment of the vari-focal photographic lens system of lens unit exchange type according to the present invention described so far is shown below.

| (state of short focal length) $f = 39.33$, F/3.6 | | |
|---|---|---|
| $r_1 = 14.784$ | | |
| $d_1 = 3.6$ | $n_1 = 1.7725$ | $\nu_1 = 49.7$ |
| $r_2 = 31.9$ | | |
| $d_2 = 1.97$ | | |
| $r_3 = -57.494$ | | |
| $d_3 = 1$ | $n_2 = 1.7847$ | $\nu_2 = 26.2$ |
| $r_4 = 24.607$ | | |
| $d_4 = 2.8$ | | |
| $r_5 = 28.691$ | | |
| $d_5 = 3.72$ | $n_3 = 1.8061$ | $\nu_3 = 41.0$ |
| $r_6 = -49.393$ | | |
| $D_1 = 3.94$ | | |
| $R_1 = -166.151$ | | |
| $D_2 = 4.23$ | $N_1 = 1.883$ | $V_1 = 40.8$ |
| $R_2 = -19.461$ | | |
| $D_3 = 0.78$ | | |
| $R_3 = -12.39$ | | |

| -continued | | |
|---|---|---|
| $D_4 = 0.86$ | $N_2 = 1.5927$ | $V_2 = 35.3$ |
| $R_4 = 739.388$ | | |
| $D_5 = 3.37$ | | |
| $r_7 = -20.157$ | | |
| $d_6 = 1.5$ | $n_4 = 1.50137$ | $\nu_4 = 56.4$ |
| $r_8 = -20.952$ | | |
| position of stop: 0.46 from surface $r_6$ | | |

| (state of long focal length) $f = 48.25$, F/4 | | |
|---|---|---|
| $r_1 = 14.784$ | | |
| $d_1 = 3.6$ | $n_1 = 1.7725$ | $\nu_1 = 49.7$ |
| $r_2 = 31.9$ | | |
| $d_2 = 1.97$ | | |
| $r_3 = -57.494$ | | |
| $d_3 = 1$ | $n_2 = 1.7847$ | $\nu_2 = 26.2$ |
| $r_4 = 24.607$ | | |
| $d_4 = 2.8$ | | |
| $r_5 = 28.691$ | | |
| $d_5 = 3.72$ | $n_3 = 1.8061$ | $\nu_3 = 41.0$ |
| $r_6 = -49.393$ | | |
| $D'_1 = 10.81$ | | |
| $R'_1 = -8.93$ | | |
| $D'_2 = 1$ | $N'_1 = 1.50137$ | $V'_1 = 56.4$ |
| $R'_2 = -12.917$ | | |
| $D'_3 = 4.1$ | | |
| $r_7 = -20.157$ | | |
| $d_6 = 1.5$ | $n_4 = 1.50137$ | $\nu_4 = 56.4$ |
| $r_8 = -20.952$ | | |
| position of stop: 3.18 from surface $r_6$ | | |

In the embodiment shown in the above, reference symbols $r_1$ through $r_8$, $R_1$ through $R_4$, $R'_1$ and $R'_2$ respectively represent radii of curvature of respective lens surfaces, reference symbols $d_1$ through $d_6$, $D_1$ through $D_5$, $D'_1$, $D'_2$ and $D'_3$ respectively represent thicknesses of respective lenses and airspaces between respective lenses, reference symbols $n_1$ through $n_4$, $N_1$, $N_2$ and $N'_1$ respectively represent refractive indices of respective lenses, and reference symbols $\nu_1$ through $\nu_4$, $V_1$, $V_2$ and $V'_1$ respectively represent Abbe's numbers of respective lenses.

Figure 1:
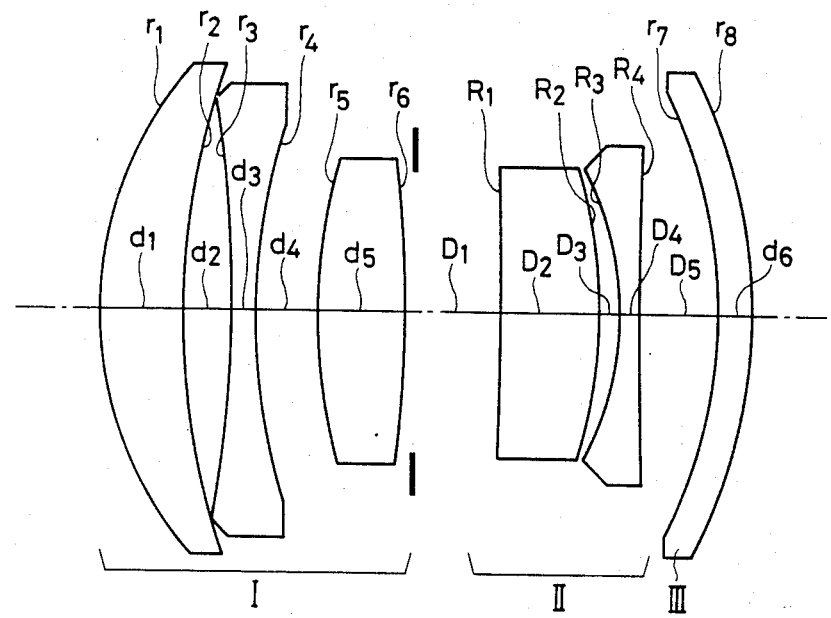
FIG. 1 shows a sectional view of an embodiment of the vari-focal photographic lens system of lens group exchange type according to the present invention in the state of short focal length.
Figure 2:
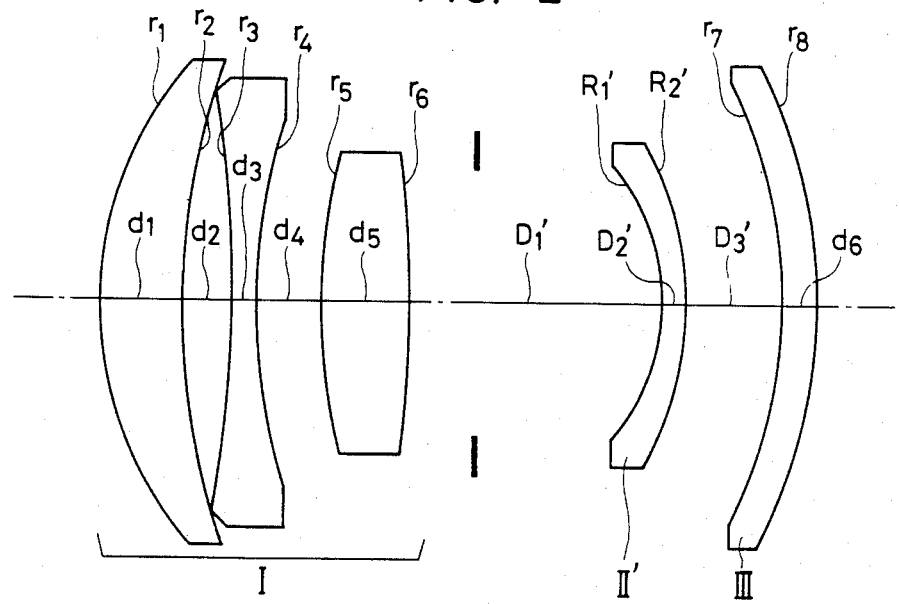
FIG. 2 shows a sectional view of said embodiment of the present invention in the state of long focal length.
Figure 3:
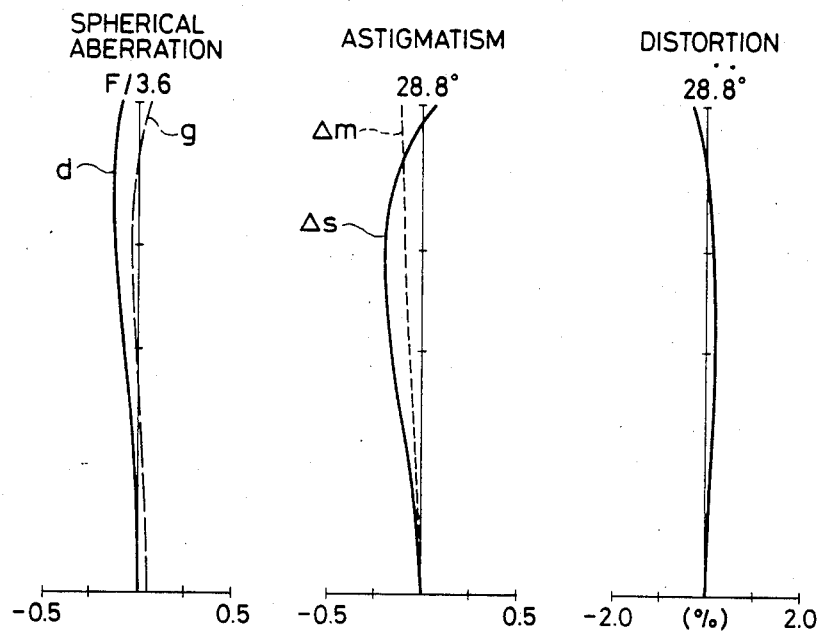
FIG. 3 shows graphs illustrating aberration curves of said embodiment in the state shown in FIG. 1.
Figure 4:
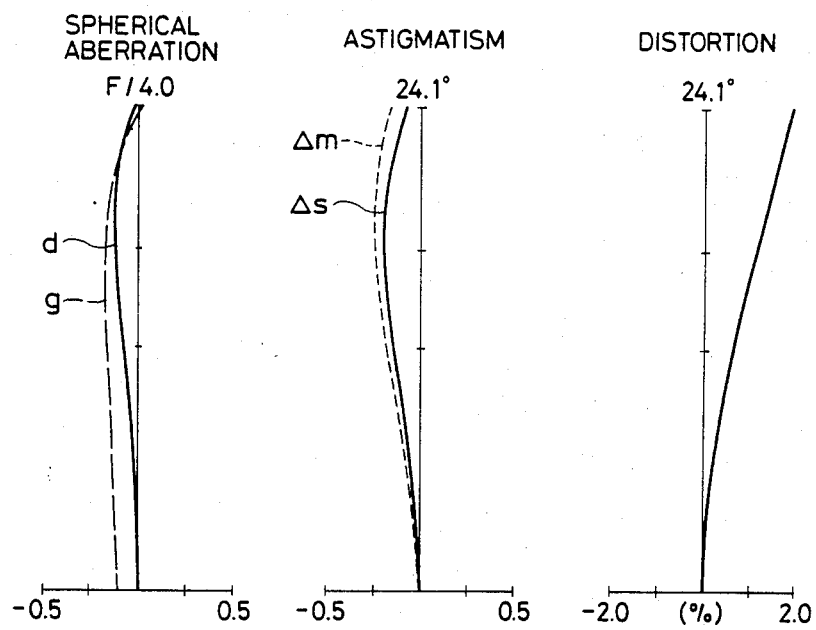
FIG. 4 shows graphs illustrating aberration curves of said embodiment in the state shown in FIG. 2.

In the embodiment shown in the above, the state of short focal length is as shown in FIG. 1. That is, in the state of short focal length, the first lens unit I comprises a positive lens component, a negative lens component and a positive lens component, the second lens unit II comprises a positive lens component and a negative lens component, and the third lens unit III comprises a negative lens component. To change over the lens system from the above-mentioned state to the state of long focal length, the second lens unit II is exchanged for another second lens unit II' comprising a negative lens component by inserting the second lens unit II' as shown in FIG. 2 so that its optical axis is aligned with the optical axis formed by the first lens unit I and the third lens unit II and, at the same time, the first lens unit I is moved along the optical axis toward the object side so that the image surface is maintained at a position of constant distance from the third lens unit III. At that time, the position of the stop is fixed in respect to the image surface.

Focal lengths of respective lens unit constituting said embodiment are as shown below:

| | |
|---|---|
| $f_W/f_I = 1.174$ | $f_W/f_{II-W} = -0.279$ |
| $f_W/f_{II-T} = -0.624$ | $f_W/f_{III} = -0.014$ | where, reference symbol $f_{II-W}$ represents the focal length of the second lens unit II when the lens system is in the state of short focal length, and reference symbol $f_{II-T}$ represents the focal length of the second lens group II' when the lens system is in the state of long focal length.

By distributing the focal lengths of respective lens units as shown in the above, it is possible to limit the amount of movement of the first lens unit to a value smaller than 3 mm and, through the position of the stop is kept fixed in respect to the image surface, it is possible to minimize the variation of aberrations to be caused by the variation of the position of the entrance pupil.

As described so far, the vari-focal photographic lens system of lens unit exchange type according to the present invention is arranged to vary the focal length of the lens system as a whole by exchanging the second lens unit having negative refractive power and, at the same time, arranged that the image position is kept unchanged, even when the focal length of the lens system is varied, by moving the first lens unit having positive refractive power along the optical axis, said vari-focal photographic lens system being thereby arranged to be small in size and arranged that the variation of aberrations is small. Besides, as the stop is arranged between the first lens unit and the second lens unit, it is not necessary to move the stop even when moving the first lens unit and when exchanging the second lens unit and, therefore, the stop mechanism does not become complicated.

We claim:

1. A vari-focal photographic lens system of the type capable of a lens unit exchange comprising, in the order from the object side, a first lens unit having positive refractive power, a second lens unit having negative refractive power, and a third lens unit having negative refractive power, and being arranged to vary the focal length thereof by exchanging said second lens unit for another second lens unit having different lens configuration and, at the same time, to move said first lens unit in the direction of the optical axis so as to keep the image position unchanged, said vari-focal photographic lens system of lens unit exchange type being arranged so that said first lens unit comprises two positive lens components and one negative lens component, each of said second lens units comprises one negative lens component, and said third lens unit comprises one negative lens component, said vari-focal photographic lens system of lens unit exchange type being arranged to fulfill the conditions (1), (2) and (3) shown below:

$$1.0 < f_W/f_I < 2.0 \quad (1)$$

$$-0.6 < f_W/f_I I < 0 \quad (2)$$

$$-1.0 < f_W/f_I II < 0 \quad (3)$$

where, reference symbols $f_I$, $f_{II}$ and $f_{III}$ respectively represent focal lengths of the first, second and third lens units, and reference symbol $f_W$ represents the focal length of the lens system as whole in the state of short focal length.

2. A vari-focal photographic lens system of the type capable of a lens unit exchange according to claim 1 wherein said first lens unit comprises a positive lens component, a negative lens component and a positive lens component, said second lens unit comprises a positive lens component and a negative lens component, and said third lens component comprises a negative lens component, said vari-focal photographic lens system of lens unit exchange type being arranged to vary the focal length thereof by exchanging said second lens unit for said another second lens unit comprising a negative lens component, said vari-focal photographic lens system of lens unit exchange type having the following numerical data:

| (state of short focal length) $f = 39.33$, F/3.6 | | |
|---|---|---|
| $r_1 = 14.784$ | | |
| $d_1 = 3.6$ | $n_1 = 1.7725$ | $\nu_1 = 49.7$ |
| $r_2 = 31.9$ | | |
| $d_2 = 1.97$ | | |
| $r_3 = -57.494$ | | |
| $d_3 = 1$ | $n_2 = 1.7847$ | $\nu_2 = 26.2$ |
| $r_4 = 24.607$ | | |
| $d_4 = 2.8$ | | |
| $r_5 = 28.691$ | | |
| $d_5 = 3.72$ | $n_3 = 1.8061$ | $\nu_3 = 41.0$ |
| $r_6 = -49.393$ | | |
| $D_1 = 3.94$ | | |
| $R_1 = -166.151$ | | |
| $D_2 = 4.23$ | $N_1 = 1.883$ | $V_1 = 40.8$ |
| $R_2 = -19.461$ | | |
| $D_3 = 0.78$ | | |
| $R_3 = -12.39$ | | |
| $D_4 = 0.86$ | $N_2 = 1.5927$ | $V_2 = 35.3$ |
| $R_4 = 739.388$ | | |
| $D_5 = 3.37$ | | |
| $r_7 = -20.157$ | | |
| $d_6 = 1.5$ | $n_4 = 1.50137$ | $\nu_4 = 56.4$ |
| $r_8 = -20.952$ | | |
| position of stop: 0.46 from surface $r_6$ | | |

| (state of long focal length) $f = 48.25$, F/4 | | |
|---|---|---|
| $r_1 = 14.784$ | | |
| $d_1 = 3.6$ | $n_1 = 1.7725$ | $\nu_1 = 49.7$ |
| $r_2 = 31.9$ | | |
| $d_2 = 1.97$ | | |
| $r_3 = -57.494$ | | |
| $d_3 = 1$ | $n_2 = 1.7847$ | $\nu_2 = 26.2$ |
| $r_4 = 24.607$ | | |
| $d_4 = 2.8$ | | |
| $r_5 = 28.691$ | | |
| $d_5 = 3.72$ | $n_3 = 1.8061$ | $\nu_3 = 41.0$ |
| $r_6 = -49.393$ | | |
| $D'_1 = 10.81$ | | |
| $R'_1 = -8.93$ | | |
| $D'_2 = 1$ | $N'_1 = 1.50137$ | $V'_1 = 56.4$ |
| $R'_2 = -12.917$ | | |
| $D'_3 = 4.1$ | | |
| $r_7 = -20.157$ | | |
| $d_6 = 1.5$ | $n_4 = 1.50137$ | $\nu_4 = 56.4$ |
| $r_8 = -20.952$ | | |
| position of stop: 3.18 from surface $r_6$ | | | where, reference symbols $r_1$ through $r_8$, $R_1$ through $R_4$, $R'_1$ and $R'_2$ respectively represent radii of curvature of respective lens surfaces, reference symbols $d_1$ through $d_6$, $D_1$ through $D_5$, $D'_1$, $D'_2$ and $D'_3$ respectively represent thicknesses of respective lenses and airspaces between respective lenses, reference symbols $n_1$ through $n_4$, $N_1$, $N_2$ and $N'_1$ respectively represent refractive indices of respective lenses, and reference symbols $\nu_1$ through $\nu_4$, $V_1$, $V_2$ and $V'_1$ respectively represent Abbe's number of respective lenses.

* * * * *